United States Patent
Cullum et al.

(10) Patent No.: US 7,644,616 B1
(45) Date of Patent: Jan. 12, 2010

(54) METHOD AND APPARATUS FOR TRACKING WHEEL BALANCER CORRECTIVE WEIGHT USAGE

(75) Inventors: William D. Cullum, Conway, AR (US); Frederick J. Rogers, Maumelle, AR (US); Steve Serio, Conway, AR (US)

(73) Assignee: Snap-On Technologies, Inc., Lincolnshire, IL (US)

( * ) Notice: Subject to any disclaimer, the term of this patent is extended or adjusted under 35 U.S.C. 154(b) by 286 days.

(21) Appl. No.: 11/445,225

(22) Filed: Jun. 2, 2006

(51) Int. Cl.
*G01M 1/02* (2006.01)
*G01M 1/38* (2006.01)

(52) U.S. Cl. .................................. 73/462; 301/5.21
(58) Field of Classification Search ............ 73/462, 73/460, 468, 487; 301/5.21, 5.22
See application file for complete search history.

(56) References Cited

U.S. PATENT DOCUMENTS

| | | | | |
|---|---|---|---|---|
| 5,544,073 A | * | 8/1996 | Piety et al. | 700/279 |
| 5,805,464 A | * | 9/1998 | Cameron et al. | 700/279 |
| 5,969,247 A | * | 10/1999 | Carter et al. | 73/462 |
| 6,672,158 B1 | * | 1/2004 | Goebel et al. | 73/462 |
| 6,948,781 B2 | * | 9/2005 | Sery | 301/5.21 |
| 6,983,207 B2 | * | 1/2006 | Gotou et al. | 702/35 |
| 6,983,656 B2 | * | 1/2006 | Cullum et al. | 73/487 |
| 2006/0254361 A1 | * | 11/2006 | Douglas | 73/642 |

FOREIGN PATENT DOCUMENTS

GB    2214999    *    9/1989

* cited by examiner

*Primary Examiner*—Helen C. Kwok
(74) *Attorney, Agent, or Firm*—McDermott Will & Emery LLP

(57) ABSTRACT

A wheel balancing system determines a type of corrective weight for application to an edge of a rim of a wheel for correcting imbalance of the wheel. One or more corrective weights are identified from a varied inventory of corrective weights. An inventory database is incremented or decremented for each identified corrective weight. Database reports can be generated that specify weight usage and inventory status. One or more wheel balancers may be coupled to a network.

20 Claims, 11 Drawing Sheets

"T" (or "P")

"TN"

"ALC"

"ALC-MC"

"ALC-IW"

"ALC-EN"

"ALC-FN"

"LH"

METHOD AND APPARATUS FOR TRACKING WHEEL BALANCER CORRECTIVE WEIGHT USAGE

RELATED APPLICATION

This application is related to the commonly assigned U.S. Pat. No. 6,983,656 of William David Cullum et al., issued Jan. 10, 2006, the disclosure of which is hereby incorporated in its entirety.

TECHNICAL FIELD

The present disclosure is directed to motor vehicle wheel balancing systems, and more particularly to a method and an apparatus for identifying corrective weights to be applied to a wheel during wheel balancing procedures and tracking weight usage inventory.

BACKGROUND

It is well known in the automotive wheel balancing art that to compensate for a static imbalance static imbalance (where the heaviest part of the wheel will seek a position directly below the mounting shaft) or a combination of static imbalance and couple imbalance (where the rotating wheel causes torsional vibrations on the mounting shaft), at least one correction weight is required to be attached to the wheel. Correction weights are commonly positioned along the wheel surface coincident with weight location "planes" that are separated axially, along the wheel surface. For clip-on weights the "left plane" conventionally comprises the left (innermost) rim lip or edge circumference, while the "right plane" comprises the right rim edge. For adhesive weights, the planes can reside anywhere between the rim edges, barring physical obstruction such as wheel spokes and welds.

Existing wheel balancing systems that utilize automatic wheel scanning devices to determine properties of a rim of a wheel (as used herein a wheel includes a rubber tire secured to a metal rim) during a wheel balancing procedure are disclosed in several patents identified and described in the Cullum et al. application, identified above. The Cullum et al. wheel balancer system automatically determines and suggests a proper type of corrective weight to be secured to a wheel rim for appropriate balance by identifying the rim profile of the wheel.

A great variety of wheels having different rim profiles are manufactured by the automotive industry. A wheel balancing technician must have on hand a supply of standardized weights, in a plurality of incremental weight values, that will fit the various types of wheels. Weights are color coded or bear alphanumeric designations in accordance with their weight types. Weights normally are held in pans or color coded bins. At present, cumulative tracking of corrective weight usage during time periods in which several wheel balancing procedures have been performed is not determined with accuracy without a personal counting of the individual weights that remain. Weight inventory thus is a problem for the wheel balance technician, especially so for high volume tire dealers. Typically, the dealer monthly will place a blanket purchase order of all weight sizes and types. Over time, a large inventory will be built up of weights for which there has been little or no usage. Conversely, the inventory may run out of weights of high usage.

The need thus exists to track the corrective weights that have been applied during all wheel balancing operations. If the user can be provided an accurate account of specific weight usage during a given period, weight purchase orders can be formulated that are concentrated in proportion to the tracked usage. Such a tracking system would be of further benefit if it could provide the user with notification when the stock on hand of particular weights are low.

SUMMARY OF THE DISCLOSURE

These needs are fulfilled, at least in part, by provision of a wheel balancer that can identify a corrective weight to be applied to a wheel during a wheel balancing procedure, track the usage of the corrective weights and periodically provide a report to inform the user of the weight value, type and quantity of corrective weights used. The wheel balancer may incorporate software to automatically decrement a stored database entry that corresponds to the identified corrective weight, and provide an update of the database. Database entries represent a plurality of types of corrective weights and weight values for each weight type and, respectively, the number of each corrective weight type and value in an inventory associated with the wheel balancer. The database may cover clip-on weight types and adhesive weight types that can carry color code identification. Conventional alpha identification codes, such as T, TN, ALC, ALC-MC, ALC-IW, ALC-EN, ALC-FN, and LH, for the various weight types may be specified. Color coding of these weights may be black, red, orange, yellow, purple, blue, green, orange, or gray.

The wheel balance procedure may identify a plurality of corrective weights for application to the wheel for which there are corresponding decrementations made in the database. The wheel balancer system is capable of generating a report of weight usage during a set time period. The report may specify the total amount decremented for each weight type and weight value during the set time period and the current inventory of the various weights. The set period and successive set periods may be defined by default by the system and can be adjusted by the user. The report may displayed to the user upon command, may be printed, and may be downloaded to a network site. An alert to the user and/or the network site can be generated when a database entry has been decremented to a specified threshold. An order for corrective weights that meet the threshold may be issued automatically in accordance with the alert. The database can be incremented by the number of the corrective weights ordered.

In implementation, the wheel balancing apparatus includes at least one scanning device for providing measured dimensions of a wheel rim configuration, a memory that contains a corrective weight database, and a controller coupled to the scanning device(s) and the memory. The controller is configured to identify a corrective weight appropriate for application to the rim of the wheel upon which the balancing procedure is conducted and decrement the usage in a database. The controller may also decrement a stored database entry that corresponds to the identified corrective weight. The controller may be coupled to a network for transmission of weight inventory information. A display device and printer are coupled to the controller for displaying and printing reports and other weight information accessed from the memory.

Additional aspects and advantages of the present disclosure will become readily apparent to those skilled in this art from the following detailed description, wherein exemplary embodiments of the present disclosure are shown and described, simply by way of illustration of the best modes contemplated for carrying out the present disclosure. As will be realized, the present disclosure is capable of other and different embodiments and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

The drawing figures depict the present invention by way of example, not by way of limitations. In the figures, like reference numerals refer to the same or similar elements.

DETAILED DESCRIPTION

Figure 1:
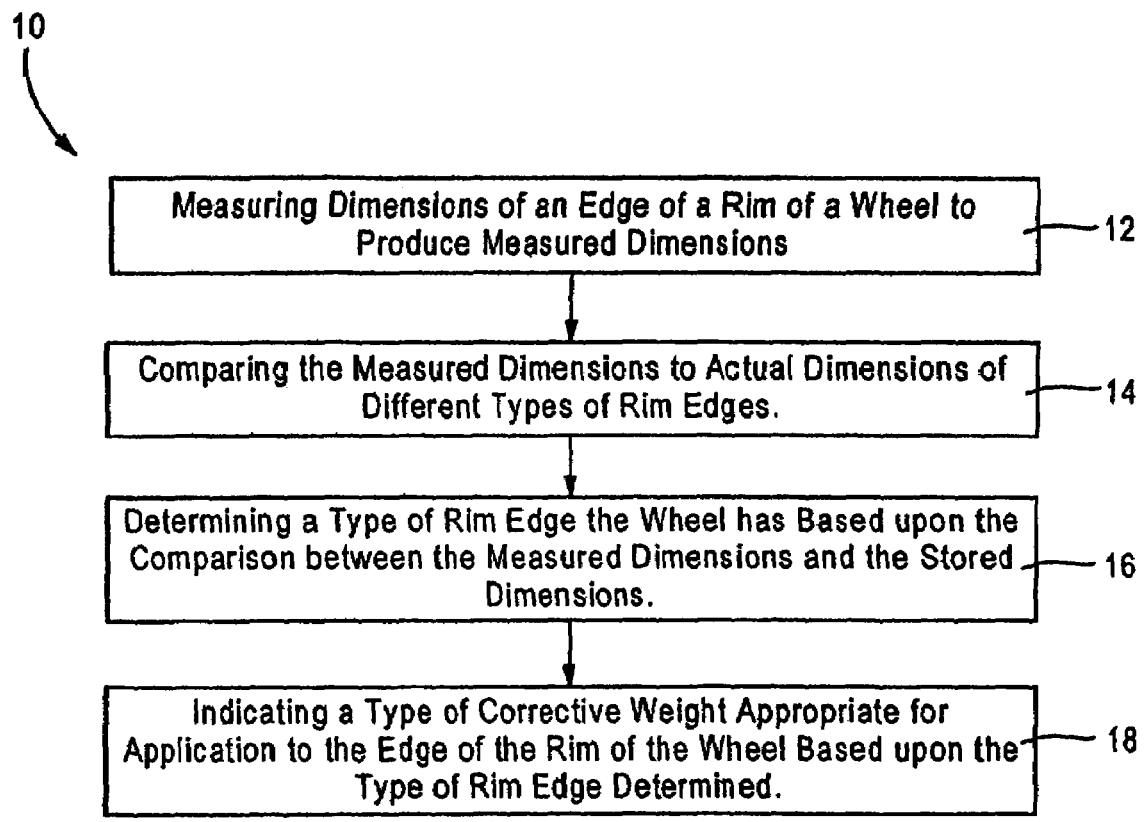
FIG. 1 is a flow chart of a method for determining a type of corrective weight for application to an edge of a rim of a wheel for correcting imbalance of the wheel, such as disclosed in the above-identified co-pending application to Cullum et al.
Figure 2:
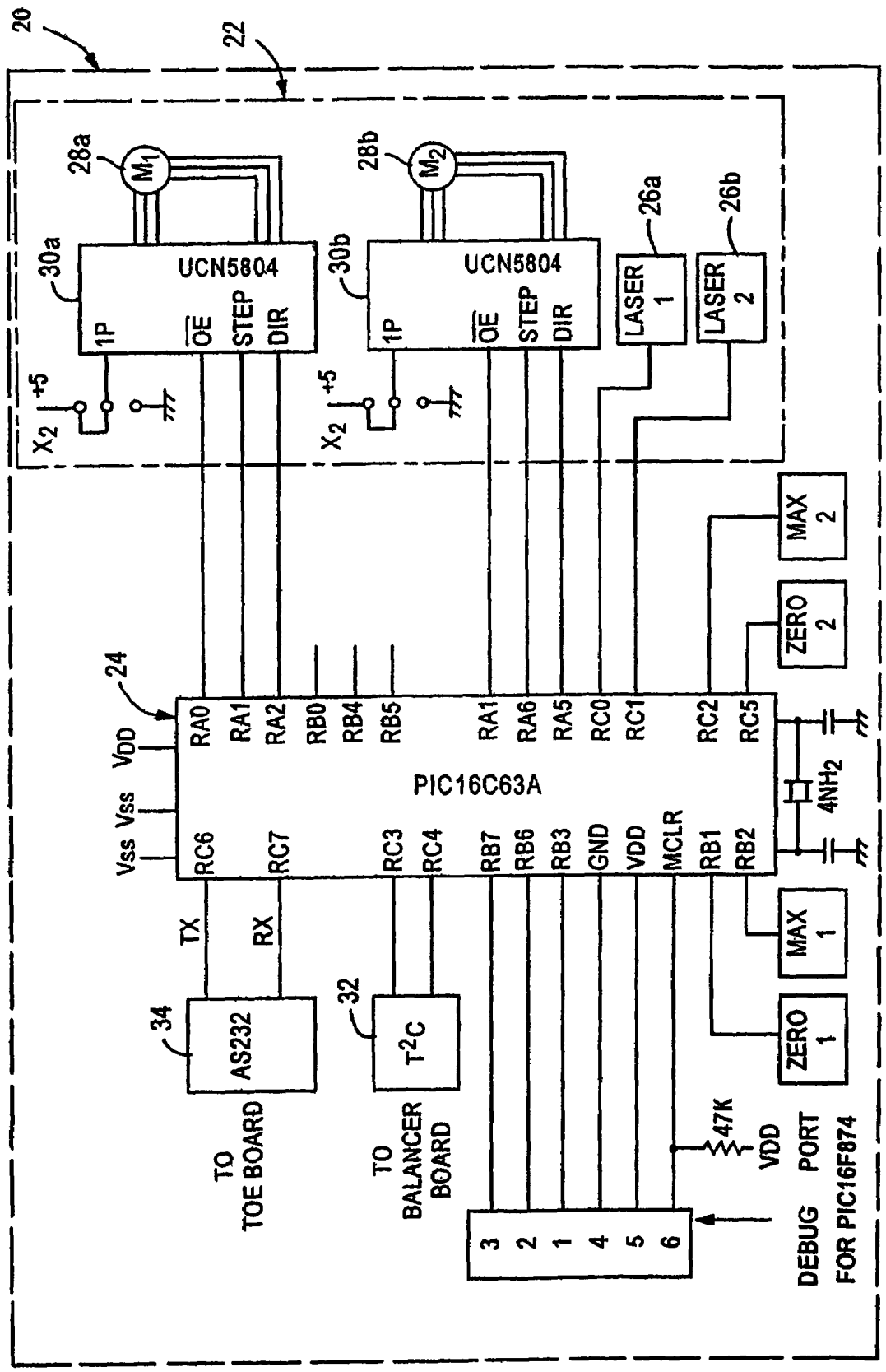
FIG. 2 is a schematic diagram of an apparatus for automatically determining and suggesting a proper type of clip-on corrective weight to be secured to a rim edge of a wheel, for use with the method of FIG. 1.

Referring to FIGS. 1 and 2, the present disclosure is directed to a method 10 and an apparatus 20 for automatically analyzing a rim edge of a wheel and suggesting a proper type of clip-on corrective weight to be secured to the rim edge. The method 10 and the apparatus 20 of the present disclosure can be used with, or incorporated into, motor vehicle wheel balancing systems and used to suggest the proper type of clip-on corrective weight once a proper amount of the weight has been determined by the balancing system. Before discussing the method 10 and the apparatus 20 of FIGS. 1 and 2, an exemplary embodiment of a balancing machine 100 according to the prior art will first be discussed to provide background information.

Figure 22:
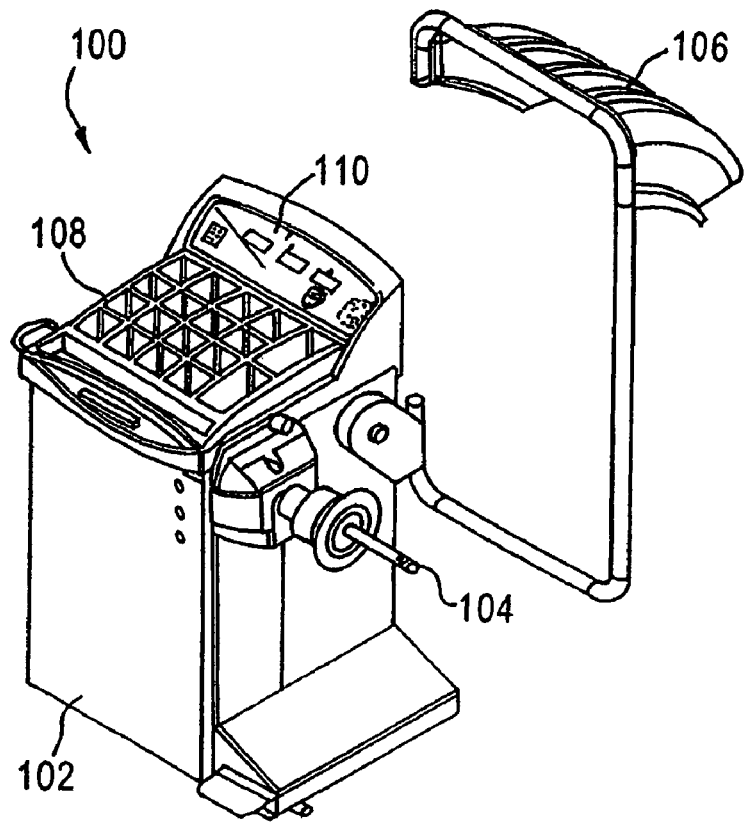
FIG. 22 is a perspective view of a known balancing machine that may be used with the apparatus of FIG. 1.

Referring to FIG. 22, an exemplary embodiment of a balancing machine 100 according to the prior art and, which may be utilized with the apparatus and the method of the present disclosure, is shown. The balancing machine 100 includes a base 102 supporting a rotatable shaft 104 upon which a wheel to be balanced can be mounted. During a balancing procedure the wheel is rotated by a motor (not shown) that turns the rotatable shaft 104. The balancing machine, 100 may also include a protective hood 106 for preventing undesirable or dangerous projections during rotation of the wheel, cases 108 for holding corrective balancing weights, and a control panel 110 having a display screen and a control panel.

The balancing machine 100 is programmable and can include several computer programs for measurement, standardization, accessory configuration, formatting and display, and computer programs for static and dynamic processing of the different types of rims, as well as a program for optimization of mounting of the tire on the rim so as to reduce the weight of the balancing weights that are used.

An example of a suitable wheel balancing machine for use with the apparatus and the method of the present disclosure is a model EEWB519A wheel balancer from the assignee of the present disclosure, Snap-On Incorporated of Kenosha, Wis. (www.snapon.com). It should be noted, however, that the apparatus and the method of the present disclosure may be used with other wheel balancing machines. Other suitable wheel balancers, for example, include the model Geodyna 6800/6800P wheel balancer, which is available from Hoffmann Canada of Mississauga, Ontario (www.hofmann.ca.com), and the type VPI™ wheel balancer available from John Bean Company of Conway Ark. (www.johnbean.com).

Figure 23:
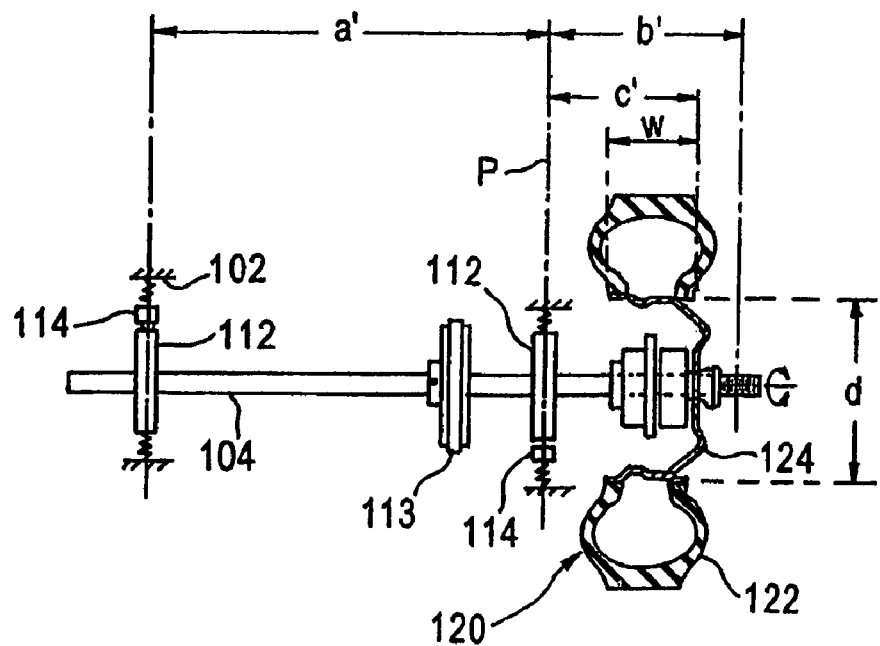
FIG. 23 is a diagrammatic elevation view of portions of the balancing machine of FIG. 22, with a vehicle wheel shown in section on a shaft of the balancing machine.

Referring to FIG. 23, a vehicle wheel 120 is shown mounted on the shaft 104 of the balancing machine of FIG. 22. The wheel 120 includes a rubber tire 122 mounted on a metal rim 124. The shaft 104 is mounted on bearings 112 supported by the base 102 of the wheel balancer, and rotationally driven through a pulley 113. A pair of force transducers 114 are mounted in the base 102 adjacent to and spaced axially along the shaft 104 at the locations of the bearings 112. The force transducers 114 are coupled mechanically to the shaft 104 and provide periodic electrical output signals indicative of dynamic unbalance forces transmitted through the shaft when the shaft is driven rotationally. The angular position of the shaft 104 is monitored by a shaft encoder (not shown) during each full revolution of the shaft. The transducer 114 output signals are usually digitized in electrical circuitry within the balancer and calculations are performed on the digitized signals to obtain unbalance force measurements at each angular increment of shaft rotation. The calculation of the unbalance forces requires that certain measurements be made relative to the mounting location of the rim 124 and the tire 122 on the shaft 104.

The distances a' and b' are known from the physical configuration of the balancer. The distances c' and "w" must be measured to obtain the inside and outside rim position locations so that a proper type of clip-on corrective weights may be applied to the rim 124 to offset unbalance in the wheel 120, which is measured when the wheel is spun rotationally on the shaft 104. The rim measurements are can be made from the plane P, and the diameter "d" of the rim 124 may also be measured. A scanning device, such as one of the exemplary embodiments shown in FIGS. 24-27, is capable of making these measurements relative to a coordinate system which is referenced to the structure of the balancing machine.

Figure 24:
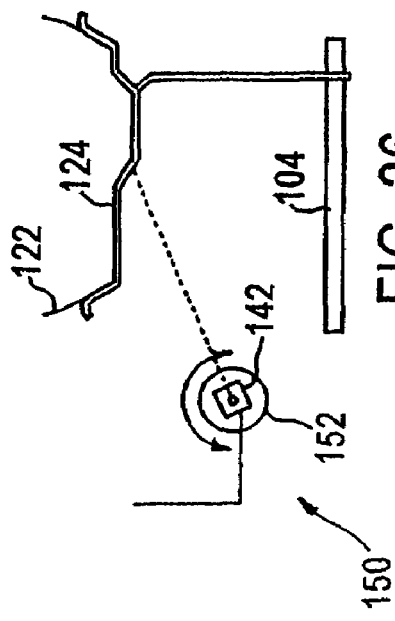
FIGS. 24 through 27 are diagrammatic views of prior art devices for scanning a rim of a vehicle wheel that may be used with the apparatus of FIG. 1.

FIG. 24 is an enlarged diagrammatic elevation view of an exemplary embodiment of a device 130 according to the prior art for scanning the rim of the vehicle wheel, which may be utilized with the apparatus and method of the present disclosure and with the balancing machine of FIG. 22. The scanning device includes a pick-up 132 which may be moved by means of a motor 134 in the horizontal direction (i.e. in parallel to the shaft) and by means of a motor 136 in the vertical direction (i.e. perpendicular to the shaft). The pick-up device 132 is connected to a computer (not shown). In operation, the pick-up 132 is moved along the inner outline of the rim 124 by means of the two motor drives 134, 136, wherein the horizontal and vertical positions of the pick-up 132 are detected either through the drives (e.g. stepping motors) themselves or by appropriate sensors (not shown). The output signals of the pick-up device 132 are transferred to the computer which evaluates the inner outline of the rim 124 in all points from the complete set of the signals. In a simpler embodiment, wherein the drives are omitted, the pick-up 132 is guided manually and along the outline of the rim 124, and the horizontal and vertical positions of the pick-up 132 are detected by sensors.

Figure 25:
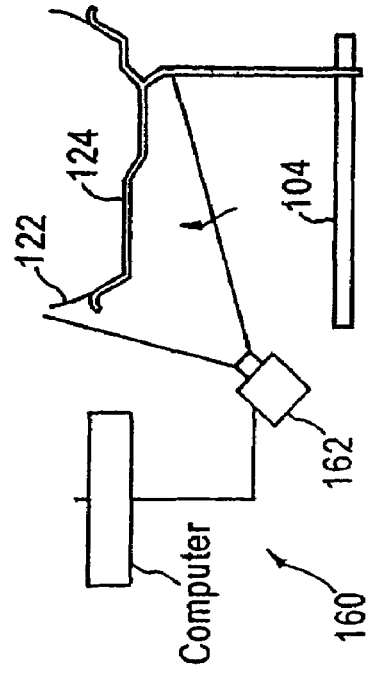

A second embodiment of a device 140 according to the prior art for scanning the rim 124 is shown in FIG. 25 and differs from the preceding embodiment in that the pick-up device comprises a distance meter 142 which is manually movable or by means of the drive 134 in the horizontal direction, the distance between the distance meter 142 and the respective point addressed at the outline of the rim 124 being detected. The computer then evaluates from this measurement the complete outline of the rim 124 and takes this into account when calculating the balancing values. The distance meter for measuring the distance to the respective point addressed at the outline of the rim may be a mechanical, optical, ultrasonic or electrical (inductive or capacitive) distance meter.

Figure 26:
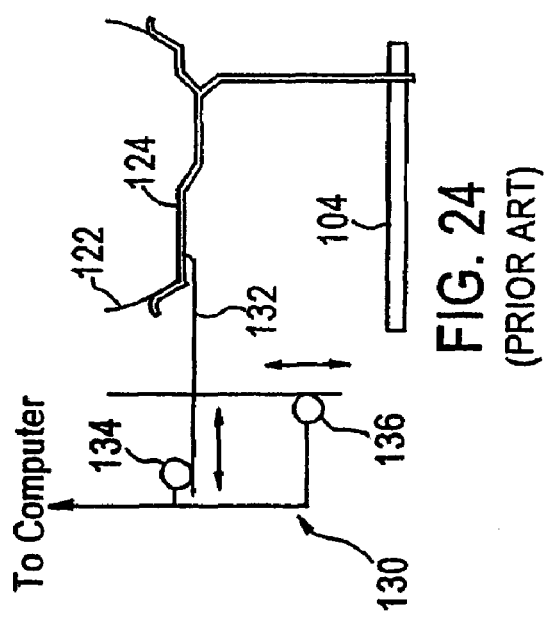

Another possible embodiment of a device 150 according to the prior art for scanning the rim 124 is shown in FIG. 26, and includes a pivotally mounted distance meter 142. The movements in the horizontal and vertical directions are replaced by pivoting movement of the distance meter 142, either manually pivotal or by means of a drive motor 152. Also in this case, the distance between the distance meter and the respective point addressed at the outline of the rim is detected, and the computer then evaluates from this measurement the complete outline of the rim 124 and takes this into account in the calculation of the balancing values.

Figure 27:
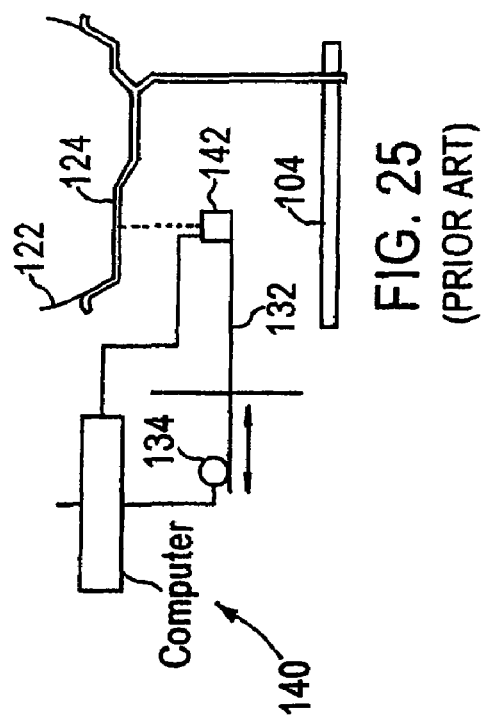

A further possible embodiment of a device 160 according to the prior art for scanning the rim 124 is shown in FIG. 27. Instead of the distance meter, a camera 162 is provided whose picture scanning area is chosen such that the inner outline of the rim 124 may by scanned completely. The camera 162, therefore, does not have be moved back and forth or pivoted. The camera 162 converts the received picture into electrical signals which are processed in the connected computer in such a way that the outline of the rim 124 is evaluated from the picture of the scanned portion of the rim.

In all of the embodiments of FIGS. 24-27, a display device may be connected to the computer to graphically show the evaluated outline, as well as the optimal balancing values at the corresponding positions of the outline as determined by the computer. By means of the display, therefore, the optimal positions for mounting the balancing weights at the rim of the wheel may be graphically displayed for an operator.

Referring again to FIG. 1, in the method 10, dimensions of an edge of a rim of a wheel are measured, as shown at step 12. The measured dimensions are compared with actual dimensions of different types of rim edges, as shown at step 14, and a type of rim edge of the wheel is determined based upon the comparison between the measured dimensions and the stored dimensions, as shown at step 16. A type of corrective weight appropriate for application to the edge of the rim of the wheel is indicated, based upon the determined type of rim edge, as shown at step 18.

Referring to FIG. 2, the exemplary embodiment of the apparatus 20 of the present disclosure includes a scanning device 22 for providing measured dimensions of an edge of a rim of a wheel, and a controller 24 programmed to compare the measured dimensions to actual dimensions of different types of rim edges, determine a type of rim edge the wheel has based upon the comparison between the measured dimensions and the stored dimensions, and provide an indication of a type of corrective weight appropriate for application to the edge of the rim of the wheel based upon the type of rim edge determined.

The scanning device 22 includes two lasers 26a, 26b, each of which is movable relative to a wheel by stepper motors 28a, 28b operated through drivers 30a, 30b. The lasers 26a, 26b can be used to determine basic dimensions of the rim of the wheel (such as the width w and the diameter d of the wheel), as well as dimensions of the rim edge of the wheel. The lasers 26a, 26b and the drivers 30a, 30b are connected to the controller 24, which is connectable to a balancing machine through a connector 32 and connectable to a user interface device through a connector 34.

The microcontroller 24 may comprise a PIC16C63A Device CMOS OTP-based 8-bit microcontroller available from Microchip Technology Incorporated of Chandler, Ariz. (www.microchip.com), and the drivers 30, 30b comprises UCN5804 stepper-motor translator drivers available from Allegro Microsystems, Inc. of Worcester, Mass. (www.allegromicro.com). The dimensional scanning lasers 26a, 26b may have a Wavelength of 650 nm, output power of less than 1 mW (Class II), input voltage of 5V, TTL modulation greater than or equal to 100 kHz, a circular or elliptical spot lens, a collimated beam size of about 0.2 mm in a range of 90-550 mm from the module, a pointing accuracy of less than 3 mrad, and dimensions of about 15 mm in diameter and 44 mm in length. Such lasers are available from Stockeryale, Inc. of Salem, N.H. (www.stockeryale.com), and Laser Components Instrument Group of Wilmington, Mass. (www.laser-components.com).

Alternatively, the lasers and motors can simply be incorporated into the wheel balancing machine and utilize the microcontroller of the wheel balancing machine, which can be reprogrammed appropriately.

Figure 3:
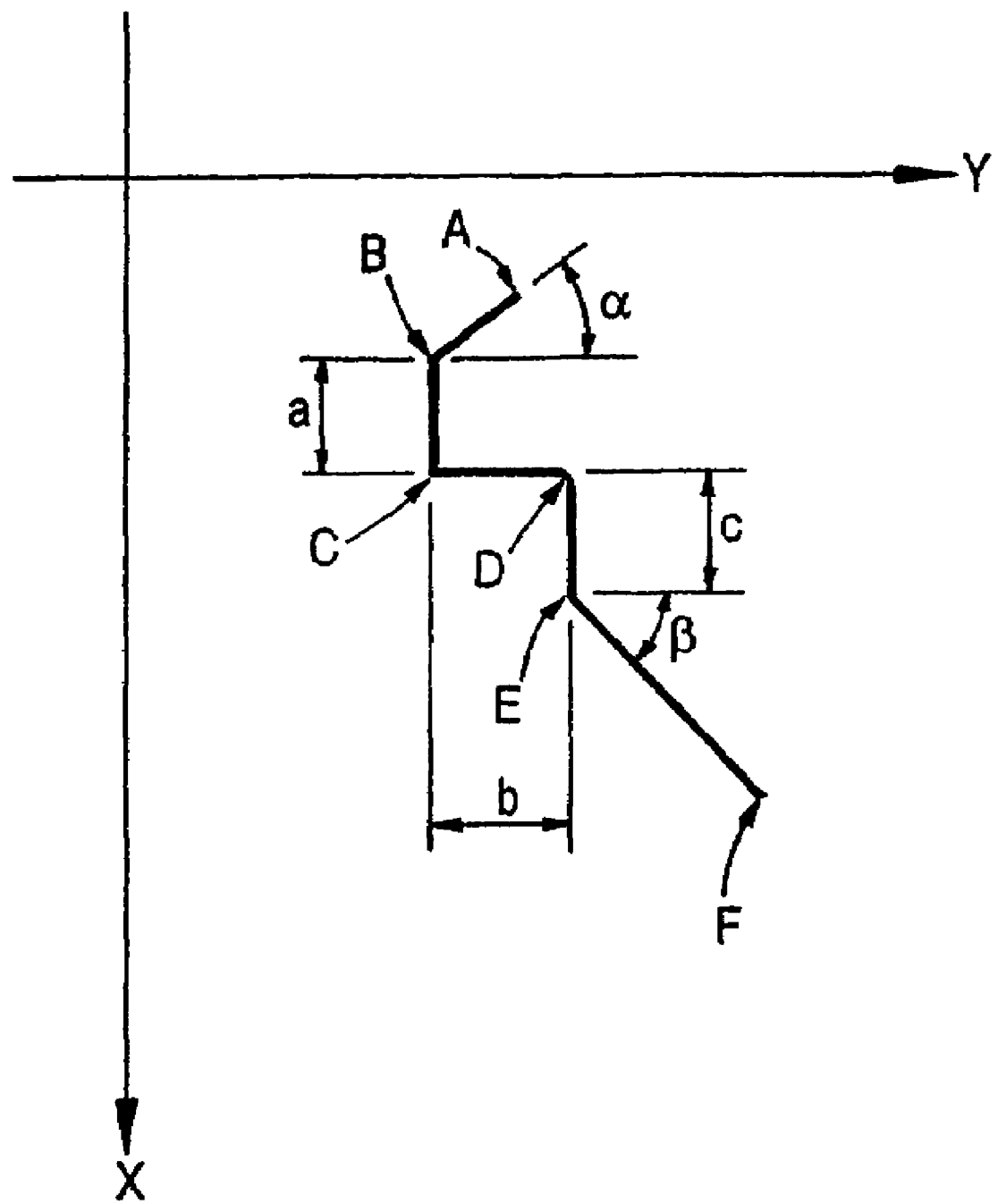
FIG. 3 is an illustrative diagram of a model of an edge of a rim of a vehicle wheel showing dimensions of a wheel rim edge to be scanned during a balancing procedure.
Figure 4:
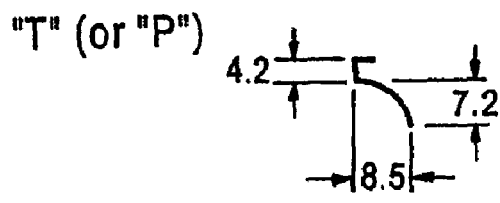
FIGS. 4 through 11 are diagrams showing actual dimensions for different types of wheel rim edges based upon the model of FIG. 3.
Figure 5:
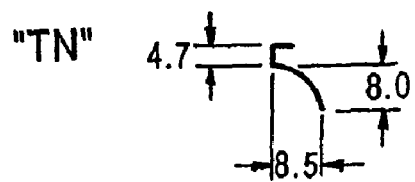
Figure 6:
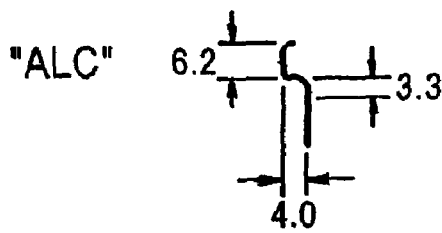
Figure 7:
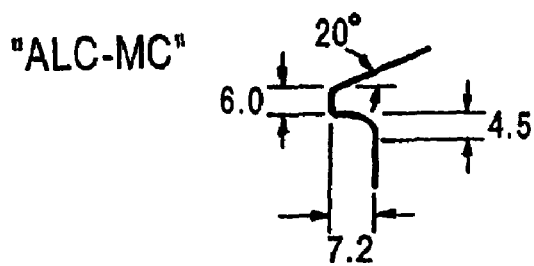
Figure 8:
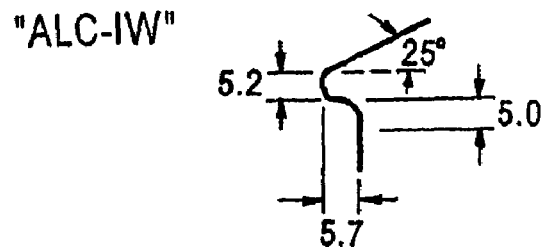
Figure 9:
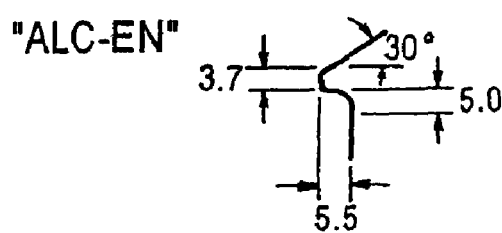
Figure 10:
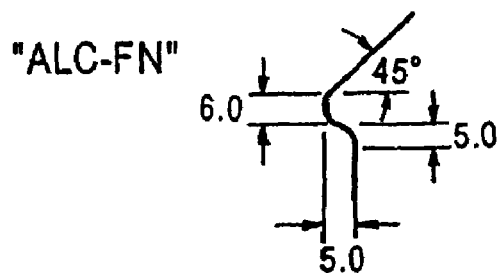
Figure 11:
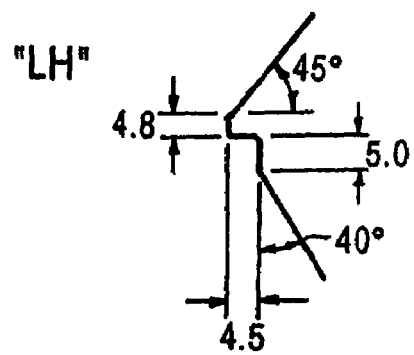
Figure 12:
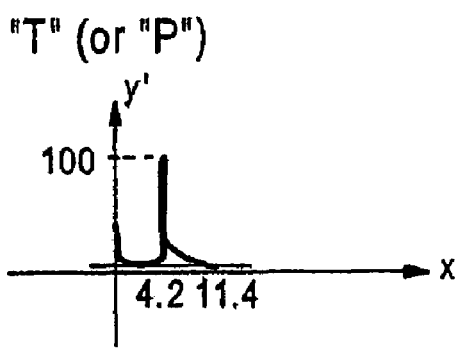
FIG. 12 through 19 are graphs showing derivatives of the actual dimensions of different rim edges, such as shown in FIGS. 4 through 11.
Figure 15:
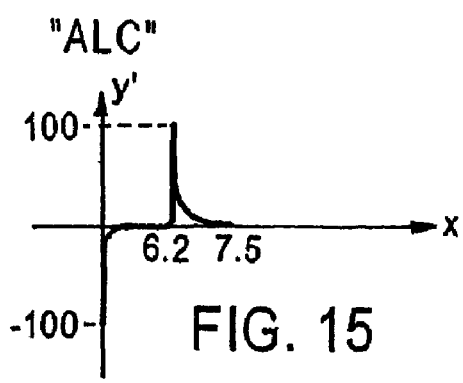
Figure 13:
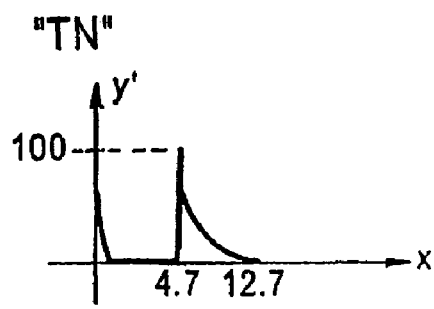
Figure 16:
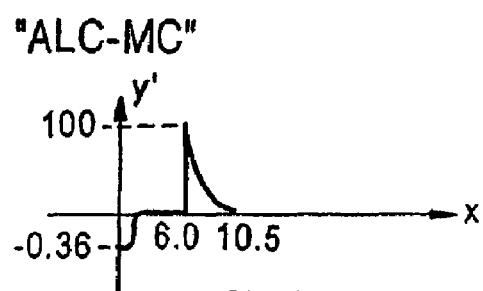
Figure 14:
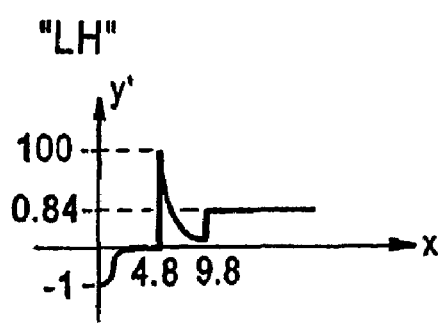
Figure 17:
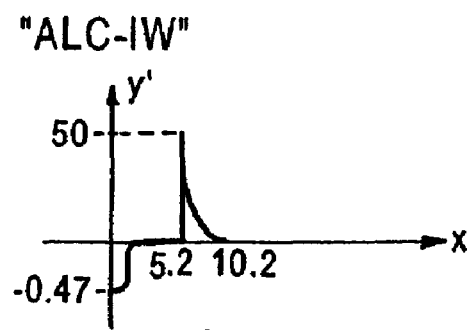
Figure 18:
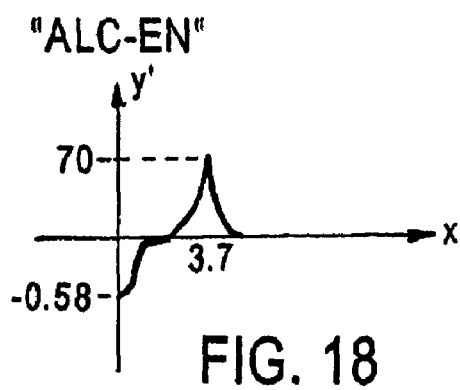
Figure 19:
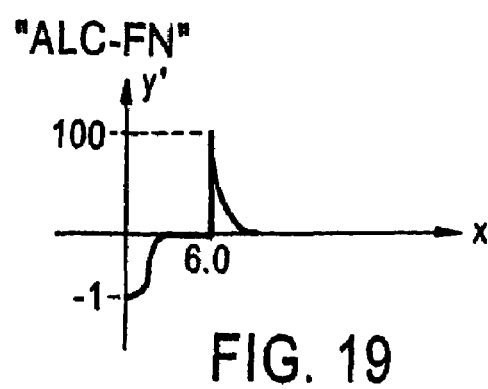

FIG. 3 is a diagram of a model of a profile of an edge of a rim of a vehicle wheel showing dimensions of a rim edge to be scanned. The edge includes transition points A, B, C, D, E and F. Dimensions of the rim edge to be scanned can include, for example, an angle "α" between a segment of the rim edge extending between points A and B and the horizontal; a length "a" of a segment of the rim edge extending between points B and C; a length "b" of a segment extending between points C and D; a length "c" of a segment extending between points D and E; and an angle "β" defined by a segment extending between points D, E and F.

FIGS. 4 through 11 are diagrams showing actual, values for the dimensions a, b, c, α, and β for different types of rim edges. These values are tabulated below in table I.

TABLE I

Dimensions of Wheel Rim Edge for Different Types of Clip-On Corrective Weights

| | Dimension "a" | Dimension "b" | Dimension "c" | Dimension "α" | Dimension "β" |
|---|---|---|---|---|---|
| Type T | 4.2* | 8.5 | 7.2* | 0° | 0° |
| Type TN | 4.7* | 8.5 | 8.0* | 0° | 0° |
| Type LH | 4.8 | 4.5 | 5.0 | 45° | 40°* |
| Type ALC | 6.2 | 4.0 | 3.3* | 0°* | 0° |
| Type ALC- | 6.0 | 7.8* | 4.5* | 20° | 0° |

TABLE I-continued

Dimensions of Wheel Rim Edge for Different Types of Clip-On Corrective Weights

| | Dimension "a" | Dimension "b" | Dimension "c" | Dimension "α" | Dimension "β" |
|---|---|---|---|---|---|
| MC Type ALC-IW | 5.2* | 5.7 | 5.0* | 25° | 0° |
| Type ALC-EN | 3.7* | 5.5 | 5.0 | 30°* | 0° |
| Type ALC-FN | 6.0* | 5.0 | 5.0 | 45°* | 0° |

These values are stored in memory of the microcontroller 24 of the apparatus 20 of FIG. 2, and are compared to scanned dimensions to determine the type of wheel rim edge being scanned. Values with an asterisk are keys used to recognize the type of wheel rim edge. For example, a large "c" value and a small "a" value indicates that the scanned wheel rim edge is one of a type T or a type TN, and if the "c" value is less than 8.0 and the "a" value is less than 4.7, then the scanned wheel rim edge is a type T. If the β value is equal to 40°, then the scanned wheel rim edge is a type LH. If the α value is equal to 0° and the "c" value is less than 4.0, then the scanned wheel rim edge is a type ALC. If the "b" is large and the "c" value is small, then the scanned wheel rim edge is a type ALC-MC. If the "a" and the "c" values are almost equal, then the scanned wheel rim edge is a type ALC-IW. If the α value is equal to 30° and the "a" value is the smallest, then the scanned wheel rim edge is a type ALC-EN. If the a value is equal to 45° and the "a" value is about equal to 6, then the scanned wheel rim edge is a type ALC-FN.

FIG. 12 through 19 are Y'-X graphs showing derivatives of actual values for the dimensions a, b, c, α, and β for different types of rim edges. The derivatives include a value of y' at a first peak of the graph, the value of x at a second peak of the graph, y' at the second peak of the graph, and y' at a plateau (if present) of the graph. These values are tabulated in Table II.

TABLE II

Derivatives of Wheel Rim Edge for Different Types of Clip-On Corrective Weights

| | $y'_1$ | x | $y'_2$ | $y'_{plateau}$ |
|---|---|---|---|---|
| Type T | 100* | 4.2* | 100* | n/a |
| Type TN | 100* | 4.7* | 100* | n/a |
| Type LH | −1.0 | 4.8 | 100 | 0.84* |
| Type ALC | −100* | 6.2 | 100* | n/a |
| Type ALC-MC | −0.4* | 6.0 | 100* | n/a |
| Type ALC-IW | −0.5 | 5.2* | 50* | n/a |
| Type ALC-EN | −0.6 | 3.7* | 70* | n/a |
| Type ALC-FN | −1.0* | 6.0 | 100* | n/a |

These values are stored in memory of the microcontroller 24 of the apparatus 20 of FIG. 2, and are compared to derivatives of scanned dimensions to determine the type of wheel rim edge being scanned. Values with an asterisk are keys used to recognize the type of wheel rim edge. According to one embodiment of the present disclosure, the method includes obtaining y=y(x) from the scanners, calculating y'=y'(x), comparing the key data (values with an asterisk) of tables I and II to the y and y' values, and indicating the type of wheel rim being scanned based upon the comparison.

Figure 20:
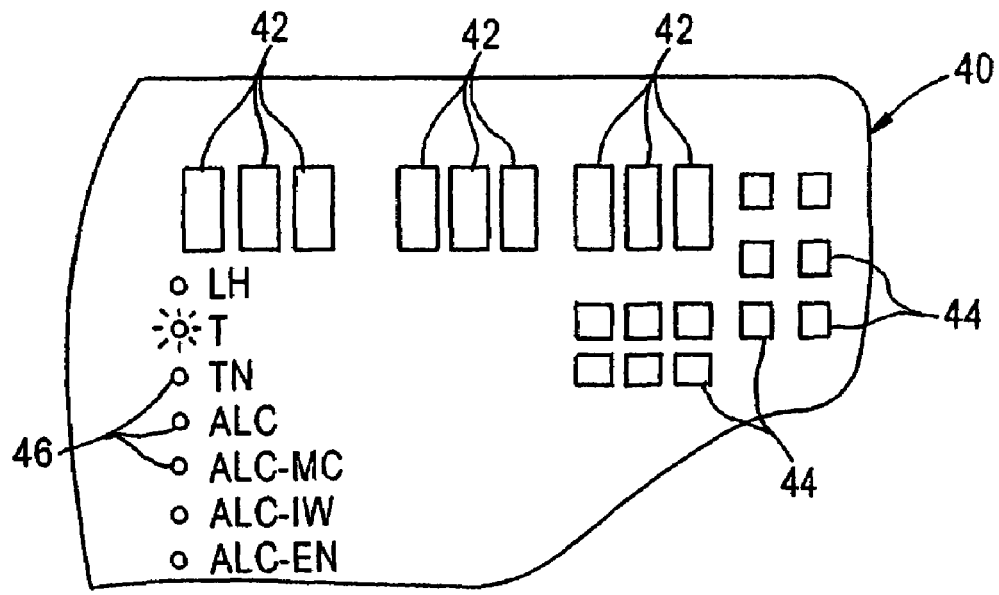
FIG. 20 is a front elevation view of an exemplary embodiment of a user interface device for use as part of the apparatus of FIG. 2.

FIG. 20 is a front elevation view of an exemplary embodiment of a user interface device 40 for use as part of the wheel balancing apparatus. The device 40 includes display elements, such as seven-segment LEDs 42, for displaying the amount of corrective weights to be applied to a rim edge of a wheel being balanced and switches 44 for allowing user input. The device 40 also includes display elements, such as LED's 46, for providing an indication of the type of clip-on corrective weight to be applied.

Figure 21:
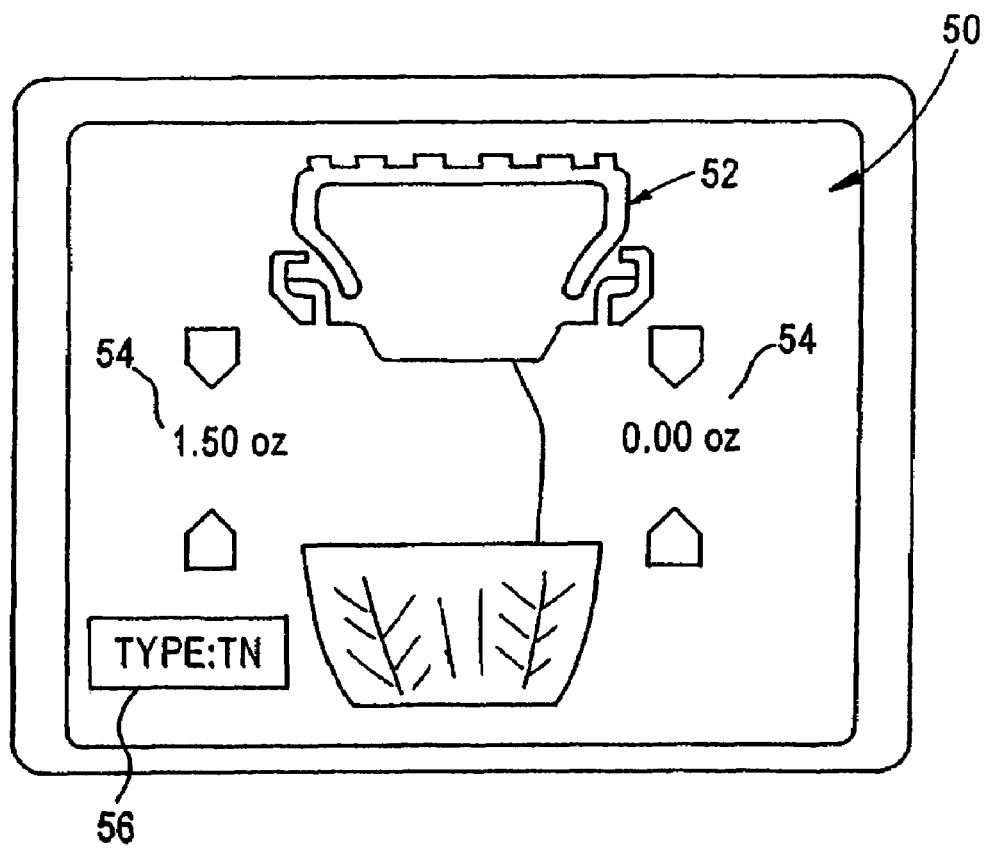
FIG. 21 is a view of a computer display for use as part of the apparatus of FIG. 2.

FIG. 21 is a view of an exemplary computer display screen that may be generated by the controller 24. Display screen 50 may a cross-section 52 of a wheel, including a rim and a tire, of amounts 54 of corrective weights to be applied to each edge of the mm of the wheel, and the proper type 56 of corrective weights to be secured to the rim edges of the wheel.

Various types of weights are provided commercially for corrective balancing the respective myriad of manufactured vehicle wheels. Corrective weights may be color coded, and of types such as clip-on or adhesive backed. The memory of controller 24 may be configured with an inventory database that stores the numbers of corrective weights used, by each type and size, by the users in normal balancing operations. For each wheel balancing procedure, for which the display screen shown in FIG. 21 may be generated, the controller may increment the database by the quantity, weight value, and type or weight used, or it may decrement the database by the number of weights identified during the balancing procedure.

Figure 28:
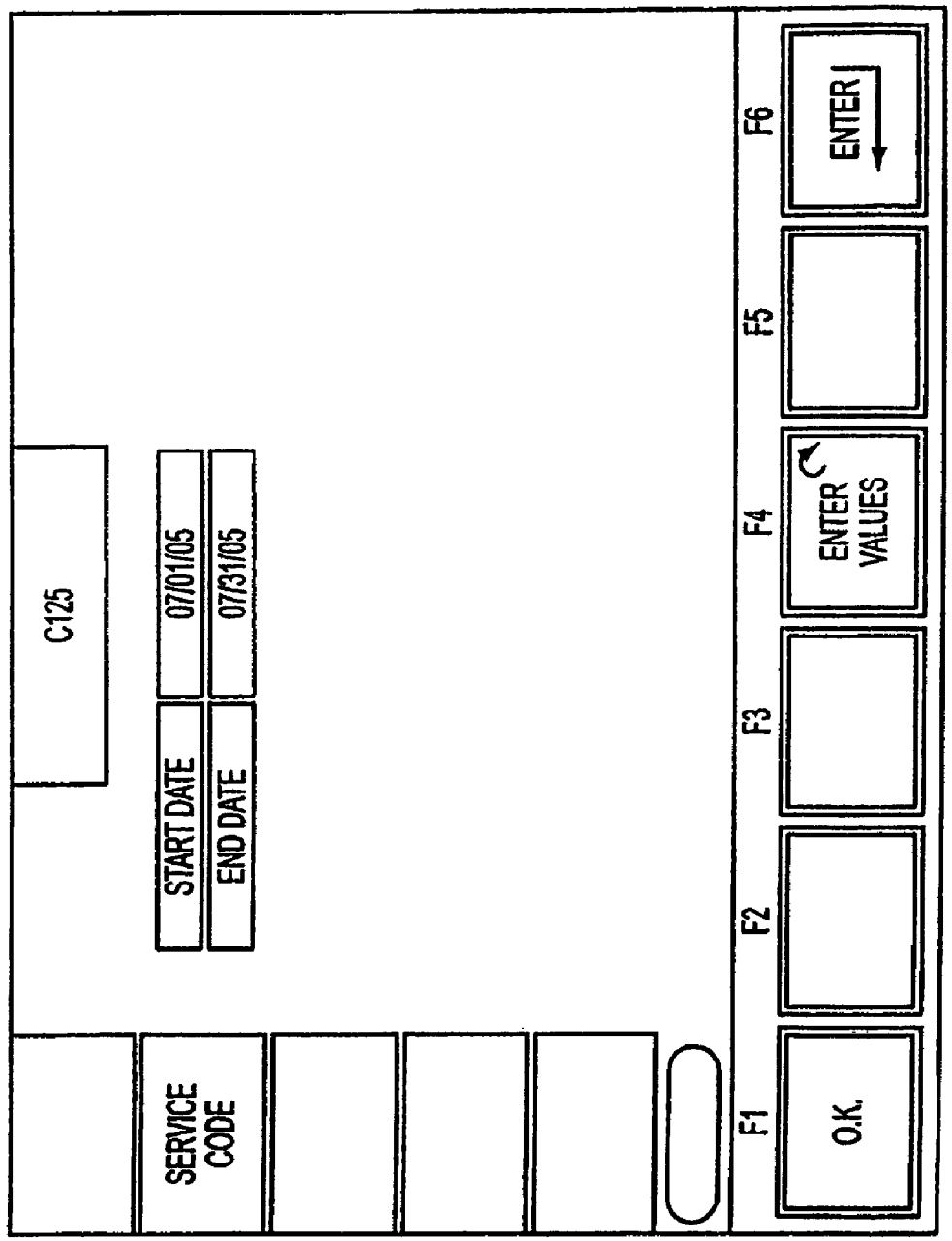
FIG. 28 is a representation of a display screen for generating a report.
Figure 29:
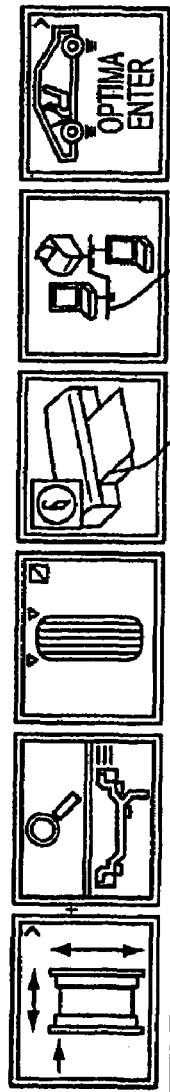
FIG. 29 is a representation of a display of a generated report.

The user may access the inventory database via controller at any time to obtain the current state of corrective weight amounts used or the on hand inventory for each type and size. The results of weight amounts used or the inventory access request may be displayed or printed. A database report can be generated for specified time period. For example, a starting date and ending date may be entered for a report request, as shown in the display illustration of FIG. 28. In response, the controller will generate an on screen report, exemplified in the display illustration of FIG. 29. A spreadsheet is shown that indicates the number of incrementations or decrementations of each weight by type and size that occurred during the report period. The user may print the report and may transmit the report to a remote site. The controller 24 may be configured to generate reports periodically in accordance with user input or automatically by default. Threshold levels may be set for generating alerts when the database has been incremented or decremented to the threshold levels.

Figure 30:
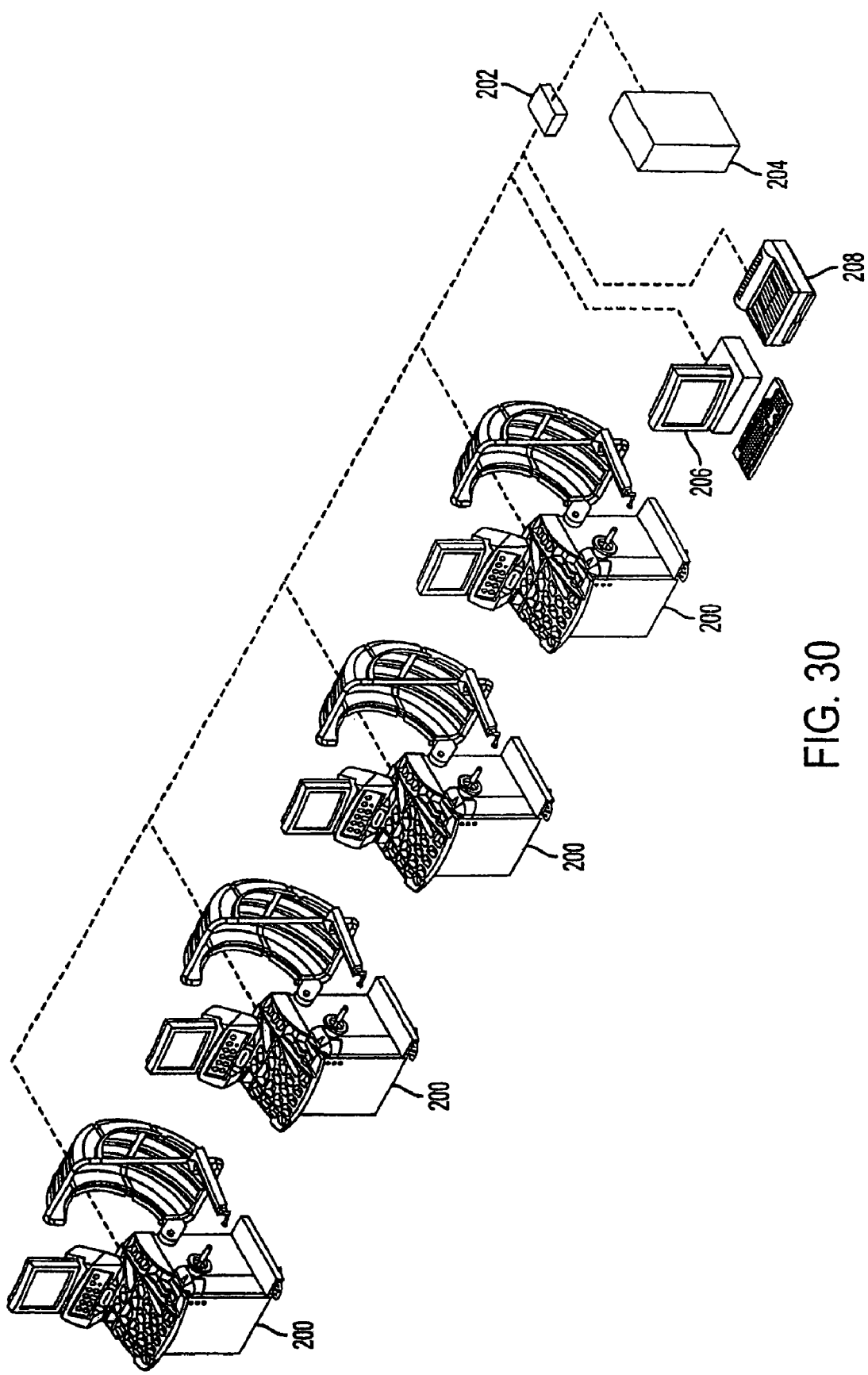
FIG. 30 is an exemplary schematic diagram of a multiple wheel balancing apparatus tracking system.

A tire dealer or automotive entity may employ a plurality of balancing apparatuses, at one or more locations, for which inventory usage is to be tracked. FIG. 30 is an exemplary schematic diagram of a multiple wheel balancing apparatus tracking system. A plurality of wheel balancing apparatuses 200 are connected, through a wired or wireless link, to hub 202 and server 204. PC 206 and printer 208 are also coupled to the network. Each wheel balancing apparatus 200 may download inventory usage reports to the remote server whereby total inventory usage can be tracked. The server, for example, can then formulate a monthly purchase order for corrective weights that are tailored to the total actual usage during the previous period and the total inventory on hand. The purchased weights can be apportioned to the individual balancers according to need as indicated in the usage reports. A threshold alert from a wheel balancer 200 may be transmitted to the server. In response, the server may generate a separate purchase order for weights identified in the alert or allocate weights from another location.

Thus, the present disclosure provides methods and apparatuses for use with wheel balancers for automatically analyzing a rim edge of a wheel and suggesting a proper type of clip-on corrective weight to be secured to the rim edge of the wheel. Methods are provided for automatically tracking weight usage and inventory, with the ability to generate reports and alerts indicating low inventory. The exemplary embodiments described in this specification have been presented by way of illustration rather than limitation, and various modifications, combinations and substitutions may be effected by those skilled in the art without departure either in spirit or scope from this disclosure in its broader aspects and as set forth in the appended claims. All methods and apparatuses disclosed herein, and all elements thereof, are contained within the scope of at least one of the following claims.

What is claimed is:

1. A wheel balancing system comprising:
   a scanning device for providing measured dimensions of a wheel rim configuration;
   a memory; and
   a controller coupled to the scanning device and the memory and configured to identify a corrective weight appropriate for application to the wheel rim and to increment or decrement an inventory database, stored in the memory, in correspondence with the identified corrective weight.

2. A system as recited in claim 1, wherein the database comprises an inventory of a plurality of types and values of corrective weights, including clip-on weight types, adhesive weight types, and weights identified by color code.

3. A system as recited in claim 1, wherein the controller is coupled to a network.

4. A system as recited in claim 3, further comprising a plurality of said scanning devices with respective memories and controllers, the plurality of controllers coupled to the network.

5. An apparatus as recited in claim 4, further comprising a display device coupled to each controller for displaying weight inventory information.

6. An apparatus as recited in claim 5, wherein the weight inventory information comprises a report specifying weight usage during a set time period.

7. An apparatus as recited in claim 5, wherein the weight inventory information comprises an alert identifying a low inventory condition.

8. An apparatus as recited in claim 7, wherein the network is coupled to a remote site for transmission of weight inventory information.

9. An apparatus as recited in claim 4, wherein the controller is configured to transmit to a network site an order for resupply of inventory.

10. An apparatus as recited in claim 4, further comprising a printer coupled to the network and shared by the plurality of controllers.

11. A method for tracking wheel balance corrective weight usage comprising the steps of:
    identifying, from a variety of corrective weights, one or more corrective weights to be applied to a wheel during each wheel balancing procedure; and
    generating a cumulative account of types, weight amounts and quantities of weights that have been identified in the identifying step for a plurality of wheel balancing procedures.

12. A method as recited in claim 11, wherein the step of generating comprises incrementing or decrementing a corrective weight database, and the steps of identifying and generating are performed by a wheel balancing apparatus.

13. A method as recited in claim 12, wherein the corrective weight database is shared by a plurality of wheel balancing apparatuses.

14. A method as recited in claim 11, the variety of corrective weights comprise clip-on weight types, adhesive weight types, and weights identified by color code.

15. A method as recited in claim 11, wherein the variety of corrective weights comprises a plurality of types of corrective weights and weight values for each weight type, and the generating step comprises formulating a database report specifying corrective weight inventory status.

16. A method as recited in claim 15, wherein the report specifies the total amount incremented or decremented for each weight type and weight value during a set time period.

17. A method as recited in claim 16, wherein the step of generating further comprises defining adjustable recurring report periods.

18. A method as recited in claim 15, wherein the step of generating further comprises downloading the report to a network site.

19. A method as recited in claim 12, further comprising the step of generating an alert when the database has been incremented or decremented to a specified threshold.

20. A method as recited in claim 19, further comprising transmitting to a network site an order for resupply of corrective weights in response to the alert.

* * * * *